No. 871,343. PATENTED NOV. 19, 1907.
I. A. KETCHAM.
APPARATUS FOR CONTROLLING FISHING NETS.
APPLICATION FILED NOV. 24, 1906.
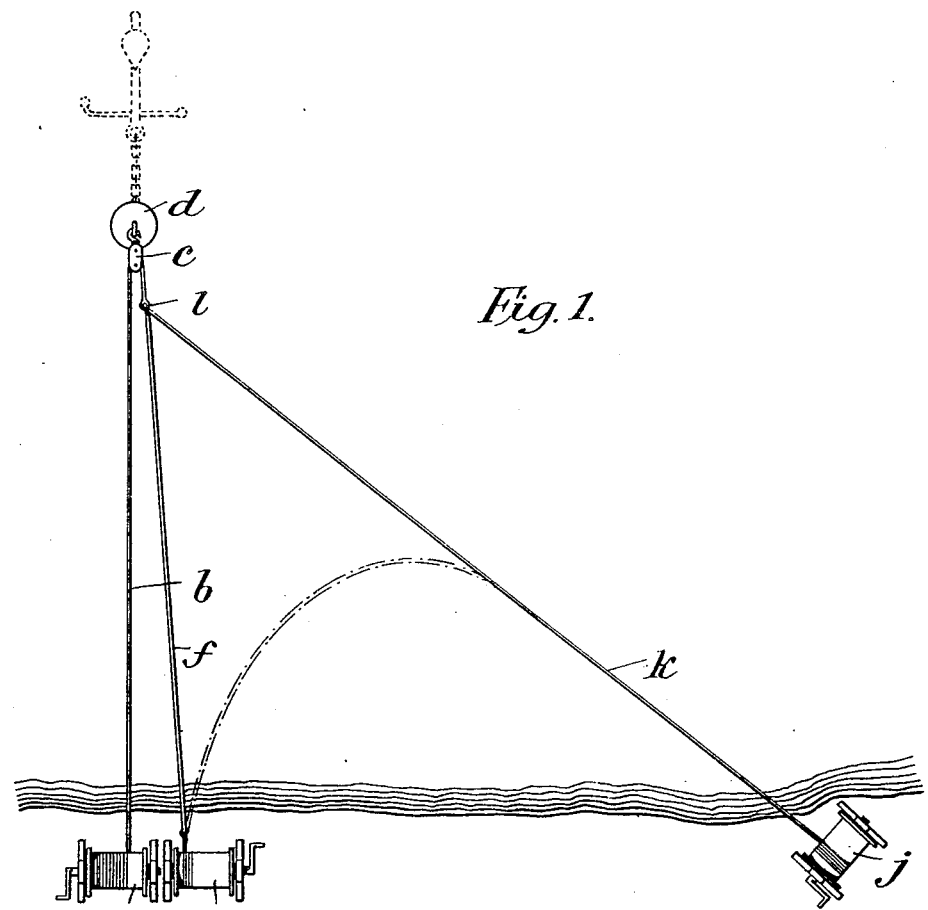
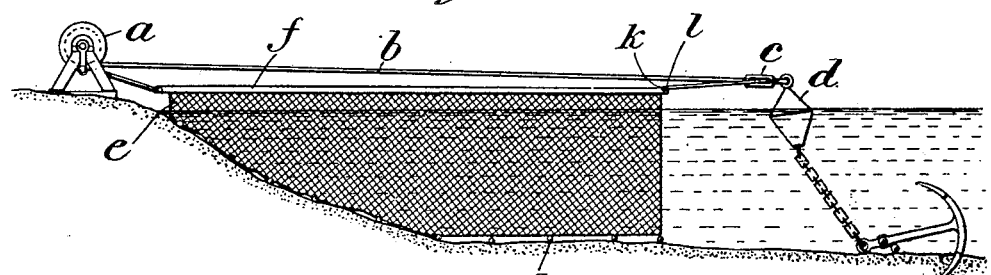
Attest: Inventor:
Isaac A. Ketcham
by Reddington ade & Greeley
Attys.

UNITED STATES PATENT OFFICE.

ISAAC A. KETCHAM, OF NEW YORK, N. Y.

APPARATUS FOR CONTROLLING FISHING-NETS.

No. 871,343.  Specification of Letters Patent.  Patented Nov. 19, 1907.

Application filed November 24, 1906. Serial No. 344,818.

*To all whom it may concern:*

Be it known that I, ISAAC A. KETCHAM, a citizen of the United States, and a resident of the borough of Brooklyn, of the city of New York and State of New York, have invented certain new and useful Improvements in Apparatus for Controlling Fishing-Nets, of which the following is a specification, reference being had to the accompanying drawing, forming a part hereof.

Owing to the nature of the sea beach, the climatic and various other conditions the work of fishermen, particularly along the eastern coast of the United States, is often rendered difficult and is sometimes interfered with to such an extent as to make fishing impossible by the methods now usually employed.

The object of my invention is to provide means whereby the fishing nets may be controlled from the shore in such a manner that fishing operations can be prosecuted under all conditions; and the invention consists in the novel features of construction and combination of parts hereinafter set forth and claimed.

In the accompanying drawing Figure 1 is a diagrammatic plan view representing my improved apparatus. Fig. 2 is a diagrammatic side view illustrating my improved apparatus in its operative position.

Arranged in a favorable location upon the beach is a reel or windlass $a$ having one end of a cable $b$ attached thereto. This cable passes through a pulley $c$ which is secured to a buoy $d$ anchored in the sea at any desired distance from the shore, and has its other end secured to a similar windlass or reel $a'$ or other equivalent device which is likewise located upon the shore. It is obvious that the reels $a$ and $a'$ may be mounted to form parts of single mechanism if desired.

The net $e$ may be of any desired form or mesh and is secured by any suitable means as at $f$ to the cable $b$. If desired the net may be wound upon the reel $a$ and may be played out attached to the cable. The net is detachably secured to the cable so it may be removed therefrom, if desired, after being drawn upon the beach. Suitable weights $h$ are preferably secured to the bottom of the net in the usual manner. A third reel or windlass $j$ is likewise placed upon the beach preferably at a distance equal to the total length of the net from the windlass $a$. A rope or cable $k$ is wound upon this windlass and is secured by any suitable means as at $l$ to the cable $b$. All of the reels or windlasses employed by me may be of a common and well known construction and no detailed description thereof is necessary.

The various parts of my improved apparatus having been arranged as described above, the operation thereof consists in first passing the cable $b$ through the pulley secured to the buoy and attaching its ends to the reels $a$ and $a'$ respectively. The end of the net is then fastened to the cable and thereupon the windlass $a'$ is operated which draws the rope through the pulley from the reel $a$ and thereby plays out the net or any desired portion of it into the sea toward the pulley and buoy $d$. The rope or cable $k$ having been first attached to the end of the net or to the cable $b$ at or near the point where the net is fastened to said cable, the reel $j$ is thereupon actuated and the reel $a'$ is correspondingly slackened, while the reel $a$ is held stationary. This results in the net being gradually drawn, first into the position shown in the dotted lines in Fig. 1 of the drawings and finally being drawn upon the beach. The net is then detached or not as desired and the reel $a$ is operated, thus returning the parts to their original position.

By means of the apparatus herein set forth it is obvious that the use of boats, after preliminary placing of the anchor to hold the buoy and pulley, is not necessary and consequently that fishing operations may be carried on continuously. It also permits the net to be left in almost any desired position, so as to form a pond or otherwise. It is evident also since the net is detachably secured to the operating cable that the reel carrying the intake cable may be shifted to either side of the reels $a$ and $a'$, according to the way the tide is running.

Various changes may be made in the details of the apparatus shown without departing from the spirit of the invention provided the means set forth in the following claims be employed:

I claim as my invention:—

1. The combination with a fishing net an operating cable secured to said net and means for drawing the same into the sea, of an intake cable secured at or near the forward end of said net and means for operating said cable to draw said net to the beach, substantially as described.

2. The combination with a fishing net, a cable secured thereto and means for operating said cable in one direction, of independent means for drawing said net to the beach, substantially as described.

3. The combination with a fishing net, a cable secured to said net, and means for operating said cable in one direction comprising a pulley anchored in the sea and a windlass, of an independent cable secured to said net, and means for actuating said cable to draw the net to the beach, substantially as described.

4. The combination with a fishing net, a cable secured to said net, a windless engaging one end of said cable a corresponding windlass engaging the other end of said cable, and a pulley anchored in the sea engaging with said cable, of an independent cable secured to said net at or near the forward end of the net and a windlass attached to said cable, whereby said net may be drawn upon the beach, substantially as described.

This specification signed and witnessed this 19th day of November, A. D., 1906.

ISAAC A. KETCHAM.

In the presence of—
AMBROSE L. O'SHEA,
H. L. PIERCE.